April 15, 1969     P. ELSNER     3,439,182
SWITCHING ARRANGEMENT FOR THE CURRENT FEED
OF AN INDUCTIVE LOAD
Filed Sept. 7, 1965

INVENTOR
*Peter Elsner*

BY *Hill & Hill*

ATTYS.

United States Patent Office 3,439,182
Patented Apr. 15, 1969

3,439,182
SWITCHING ARRANGEMENT FOR THE CURRENT FEED OF AN INDUCTIVE LOAD
Peter Elsner, Munich, Germany, assignor to Siemens Aktiengesellschaft, a corporation of Germany
Filed Sept. 7, 1965, Ser. No. 485,515
Claims priority, application Germany, Sept. 10, 1964, S 93,072
Int. Cl. H01f 27/42, 35/00
U.S. Cl. 307—104      4 Claims

ABSTRACT OF THE DISCLOSURE

A circuit arrangement for rapidly reversing the current direction in an inductive load as, for example, a writing head of a magnetic recorder and which utilizes a transformer connected in circuit with a load and a switch to obtain very rapid switching in the inductive load.

---

Figure 1:
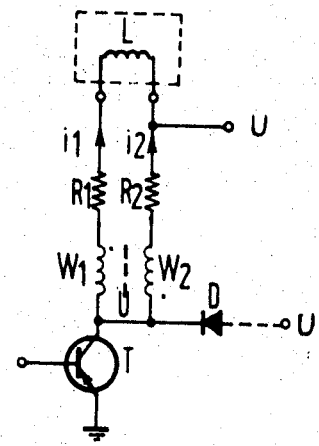

The invention is directed to a switching arrangement for the current feed of an inductive load, and has as its problem, the feeding in of a current with a rise time as short as possible, and of greater duration, in an inductive load. In the case of a simple series circuit of a source and a load, an inductive load requires, with respect to the rise time, a source having an internal resistance as high as possible, and therefore a voltage source which is as high as possible. In a simple series circuit, the smallest possible time constant is determined by the inductance of the load, the current and the operating voltage, whereby the operating voltage, with the utilization of a transistor as an electronic switch, is limited by the maximally permissible collector-emitter voltage. If the maximally available collector current of such transistors is not fully utilized, then at a given inductance and given current it is possible to achieve smaller time constants if source and load are coupled through a transformer which transforms the internal resistance of the current source. With finite values of the losses in the transformer and in the inductive load, however, this form of transformer coupling cannot be used if direct-current coupling is required. On the other hand, direct-current coupling is necessary in view of the long duration of the feeding of a current. These problems are solved according to the invention by an arrangement in which a winding of a transformer is connected in series with the inductive load and an electronic switch, and parallel to the series circuit of transformer winding and inductive load there is connected a second winding of the same transformer, with the connections being such that the voltage induced in the first winding by the rise of the current flowing in the second winding is added to the operative voltage lying on the series circuit of electronic switch, transformer winding and inductive load. The switching arrangement according to the invention combines the advantage of transformer coupling, namely the transformation of the resistance of the source, with the advantage of direct coupling, that is, of a direct-current feed.

The basic concept of the invention can be used, however, not only for the feeding of a current flowing only in one direction into an inductive load, but also for the reversing of the current direction in an inductive load, such as, for example, a writing head of a magnetic layer storer.

This is achieved by means of two electronic switches wherein a respective first winding of a transformer is connected in series with each of the two electronic switches as well as the inductive load, and, in each case, parallel to the series circuit of a transformer winding and inductive load there is connected a respective second winding of the same transformer, with the connections being such that in each case the voltage induced, by the rise of the current flowing in a second winding, in the corresponding first winding is added to the operative voltage lying on the series circuit of electronic switch, first transformer winding and inductive load, while in the other first winding a corresponding voltage is, in each case, subtracted from the operative voltage lying on the series circuit of the other electronic switch, the inductive load, and the other first transformer winding.

Figure 2:
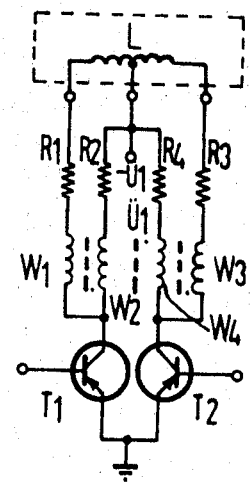

Examples of construction, according to the invention, as well as of their manner of operation, are explained in detail with the aid of FIGS. 1 and 2 which illustrate respective embodiments of the invention.

The arrangement illustrated in FIG. 1 consists primarily of an electronic switch in the form of a transistor T, an inductive load L and a transformer Ü, which has two windings W1 and W2. Of these two windings, the winding W1 is connected in series with the transistor T and the inductive load L to the operative voltage U. Parallel to the series circuit of transistor T, transformer winding W1 and inductive load L there lies the winding W2 of the transformer Ü.

This arrangement operates as follows: The transistor T switches the operative voltage U and brings about over the winding W1 of the transformer Ü a current $i1$ in the inductive load L. Besides the current $i1$ there flows an adidtional current $i2$ over the winding W2 of transformer Ü, which is poled oppositely to winding W1 and generates for the duration of the switching operation a voltage on the winding W1 which is added to the operative voltage U. Depending on the selective of the translation ratio W1/W2, this voltage may amount to a multiple of the operating voltage U. Through the fact that the operative voltage U is now increased by the induce voltage in the winding W1, the current rise in the inductive load L is accelerated.

Disposed between the inductive load L and the previously mentioned switching elements, in the switching arrangement represented in FIG. 1, are two resistors R1 and R2, which are so dimensioned with respect to the translation ratio of the windings W1 and W2 of the transformer Ü that the excitation of the transformer Ü in continuous operation becomes zero. Thereby the transformer Ü in continuous operation, is, as it were, short-circuited, whereby the desired direct current coupling is assured. However, for the dunration of the switching process itself, the transformer Ü acts as a generator.

The counter-voltages occurring on switching off of the current at the collector of transistor T can be absorbed to an admissible value (for example U) in a manner, known per se, with a directional conductor D. This is represented in FIG. 1 by the connection, indicated in broken lines, of the directional conductor D between the collector of transistor T and the voltage U. Thus, as the switching on is accelerated, the switching off of the current also is accelerated by a voltage induced in the winding W1 of transformer Ü.

A further development of the arrangement according to the invention is illustrated in FIG. 2. It is operative, by means of a reversing switch which is formed by the two transistors T1 and T2, in the supply circuit of an inductive load L, for example the writing head of a magnetic layer storer, with as short as possible a switching time, to reverse the polarity of the magnetization flux. The arrangement illustrated is symmetrically constructed and the two branches each correspond to the arrangement illustrated in FIG. 1. There is provided, however, only one transformer Ü1, which has four windings, of which the windings W1 and W3, on the other hand, as well as the windings W2 and W2, on the other hand, have in each case a like number of turns. Moreover, the windings of the two branches are in each case oppositely solid. Thereby it is additionally achieved that, in each case, only a part of the counter-voltage occurring at the inductive load passes to the collector of the blocking transistor. If, for example, the transistor T2 is conductively controlled, while simultaneously the transistor T1 is blocked, the winding W3, during the switching process, then adds an additional voltage to the operating voltage U1 and accelerates the magnetization change, while the winding W1 reduces the counter-voltage occurring at the collector of transistor T1 by the same amount.

Although various modifications might be suggested by those versed in the art, it should be understood that I wish to embody within the scope of the patent warranted hereon all such embodiments as reasonably and properly come within the scope of my contribution to the art.

I claim:

1. A switching arrangement for the current feed of an inductive load, utilizing an electronic switch, preferably a transistor, comprising a transformer, one winding of which is connected in series with the inductive load and the electronic switch, and a second winding of which is connected in parallel with the series circuit of the first transformer winding and the inductive load, said second winding being so connected that the voltage induced in the first winding, by the rise of the current flowing in the second winding, is added to the operative voltage lying on the series circuit of the electronic switch, first transformer winding and inductive load.

2. A switching arrangement according to claim 1, comprising in further combination, respective resistors, each connected in series with one of the windings of said transformer, said resistors being so dimensioned with respect to the number of turns of the windings of the transformer that the excitation of the transformer becomes zero under continuous operation.

3. A switching arrangement for the reversing of the current direction in an inductive load, as for example, a writing-reading head of a magnetic layer storer, utilizing two electronic switches, preferably transistors, comprising a transformer having a first winding for each of the two electron switches, which are respectively connected in series with the inductive load and a corresponding electronic switch, said transformer having a second winding for each switch connected in parallel with the series circuit of the corresponding first transformer winding and the inductive load, said second windings of said transformer being respectively so connected that the voltage, induced by the rise of the current flowing in one of the second windings, in the corresponding first winding is added to the operative voltage lying on the series circuit of electronic switch, such first transformer winding and the inductive load, while in the other first winding a corresponding voltage is, in each case, subtracted from the operative voltage lying on the series circuit of the other electronic switch, the inductive load and the other first transformer winding.

4. A switching arrangement according to claim 3, comprising in further combination, respective resistors, each connected in series with one of the windings of said transformer, said resistors being so dimensioned with respect to the number of turns of the windings of the transformer that the excitation of the transformer becomes zero under continuous operation.

References Cited

UNITED STATES PATENTS

| | | | |
|---|---|---|---|
| 2,941,125 | 6/1960 | Lippincott | 307—106 X |
| 3,149,244 | 9/1964 | Barnes et al. | 307—104 |
| 3,183,412 | 5/1965 | Arends | 317—123 |

ROBERT S. MACON, *Primary Examiner.*

D. SMITH, JR., *Assistant Examiner.*

U.S. Cl. X.R.

307—107